United States Patent
Aiello et al.

(10) Patent No.: US 11,232,446 B2
(45) Date of Patent: Jan. 25, 2022

(54) CARRIER GRADE TELECOM BLOCKCHAIN

(71) Applicant: Hewlett Packard Enterprise Development LP, Houston, TX (US)

(72) Inventors: Fabio Aiello, Rome (IT); Gary Dean Iosbaker, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/171,759

(22) Filed: Oct. 26, 2018

(65) Prior Publication Data
US 2020/0134620 A1 Apr. 30, 2020

(51) Int. Cl.
*G06Q 20/40* (2012.01)
*H04L 29/06* (2006.01)
(Continued)

(52) U.S. Cl.
CPC ......... *G06Q 20/401* (2013.01); *G06Q 20/389* (2013.01); *H04L 63/0876* (2013.01); *H04L 67/1074* (2013.01); *G06Q 2220/00* (2013.01)

(58) Field of Classification Search
CPC .................................................. G06Q 20/401
See application file for complete search history.

(56) References Cited

U.S. PATENT DOCUMENTS 9,100,175 B2  8/2015  Nix
9,231,931 B2  1/2016  Park et al.
(Continued)

FOREIGN PATENT DOCUMENTS

CN  107820238 A  3/2018
EP  3284213 A1  2/2018
(Continued)

OTHER PUBLICATIONS

Langberg Ehud, "Blockchains in Mobile Networks", 2017, Retrieved on May 30, 2018, 16 Pgs. http://e.huawei.com/fr/publications/global/ict_insights/201703141505/core-competency/201703150928.
(Continued)

*Primary Examiner* — Jay Huang
(74) *Attorney, Agent, or Firm* — Sheppard Mullin Richter & Hampton LLP

(57) ABSTRACT

The disclosure relates an edge digital gate ("EDG") configured with entitlement services, universal identity repositories, and connection concentrator functions. The universal identity repositories each include a shared cache that together with other shared caches form a shared data environment ("SDE"). The SDE provides a distributed and shared cache used to chain together EDGs for operation as a blockchain network. The SDE may be check-pointed by stateless Virtual Network Functions ("VNFs") executing on the EDGs responsive to service demand and access, thus facilitating distributed consensus for validating each transaction. Through SDE the stateless VNFs disperse transaction-status based on a smart contract, which enforce transactions associated with blockchain-based digital services to which access is provided by the EDGs. The activity relating to the transactions may be recorded on a decentralized ledger of a blockchain network, generating an immutable record of activity of the entity and secure storage of service data.

17 Claims, 6 Drawing Sheets

(51) Int. Cl.
    *H04L 29/08*     (2006.01)
    *G06Q 20/38*     (2012.01)

(56) References Cited

U.S. PATENT DOCUMENTS

| | | | |
|---|---|---|---|
| 9,838,376 B1 * | 12/2017 | Lander | H04L 63/0861 |
| 9,967,745 B2 | 5/2018 | Marquardt et al. | |
| 10,521,780 B1 * | 12/2019 | Hopkins, III | G06Q 20/10 |
| 10,601,703 B2 * | 3/2020 | Parasmal | H04L 45/302 |
| 2013/0139241 A1 | 5/2013 | Leeder | |
| 2014/0031012 A1 | 1/2014 | Park et al. | |
| 2016/0105540 A1 | 4/2016 | Kwon et al. | |
| 2016/0227409 A1 | 8/2016 | Schell et al. | |
| 2017/0279774 A1 | 9/2017 | Booz et al. | |
| 2018/0019879 A1 | 1/2018 | Kravitz et al. | |
| 2018/0077151 A1 | 3/2018 | Campero et al. | |
| 2019/0121988 A1 | 4/2019 | Van et al. | |
| 2019/0370358 A1 * | 12/2019 | Nation | G06F 16/1805 |
| 2020/0076606 A1 | 3/2020 | Burke et al. | |

FOREIGN PATENT DOCUMENTS

| | | |
|---|---|---|
| EP | 3477890 A1 | 5/2019 |
| WO | 2017/074461 A1 | 5/2017 |
| WO | 2018/109598 A1 | 6/2018 |
| WO | 2018/115929 A1 | 6/2018 |
| WO | WO-2019231578 A1 | 12/2019 |

OTHER PUBLICATIONS

Stanciu, A. et al., "Blockchain Based Distributed Control System for Edge Computing", 2017 21st International Conference on Control Systems and Computer Science, IEEE, May 29-31, 2017, 5 Pgs.
Xiong et al., "When Mobile Blockchain Meets Edge Computing", Apr. 11, 2018, 16 Pgs. https://arxiv.org/pdf/1711.05938.pdf.
Zhu et al., "EdgeChain: Blockchain-based Multi-vendor Mobile Edge Application Placement", Jan. 12, 2018, https://arxiv.org/pdf/1801.04035.pdf.
Ian Smith, "Embedded SIM Remote Provisioning Architecture", Version 1.1, GSM Association, Dec. 17, 2013, pp. 1-84.
Extended European Search Report received for EP Patent Application No. 19204487.3, dated Feb. 25, 2020, 9 pages.
Leligou et al., "Smart Grid: A Demanding use case for 5G Technologies", PerSCC'18—Workshop on Pervasive Sensing for Sustainable Smart Cities and Smart Buildings, IEEE, 2018, pp. 215-220.
Oscar Novo, "Blockchain Meets IoT: An Architecture for Scalable Access Management in IoT", IEEE Internet of Things Journal, IEEE, vol. 5, No. 2, Apr. 1, 2018, pp. 1184-1195.
Xiong et al., "When Mobile Blockchain Meets Edge Computing", IEEE Communications Magazine, vol. 56, No. 8, Aug. 1, 2018, pp. 33-39.
Xu et al., "Edge Computing and Caching based Blockchain IoT Network", Proceedings of 2018 1st IEEE International Conference on Hot Information-Centric Networking (HOTICN 2018), IEEE, Aug. 15, 2018, pp. 238-239.
Extended European Search Report received for EP Patent Application No. 19202913.0, dated Mar. 9, 2020, 08 pages.
Blockchain @ Telco How blockchain can impact the telecommunications industry and its relevance to the C-Suite, (Research Paper), Retrieved Jul. 2, 2018, 13 Pages.
Dean Bubley's Disruptive Wireless: Thought-leading wireless industry analysis, available online at <https://disruptivewireless.blogspot.com/2017/05/blockchain-and-telecoms-industry.html>, May 19, 2017, 4 Pages.
Fedak, G. et al., Blockchain-Based Decentralized Cloud Computing, (Research Paper), Apr. 24, 2018, 40 Pages.
Mike Alexander, Driving Innovation in Telecommunications With Blockchain, Jan. 4, 2018, 5 Pages.

\* cited by examiner

COMPONENT 500

HARDWARE PROCESSOR(S) 502

MACHINE-READABLE STORAGE MEDIUM 504

ESTABLISH, BY A CONNECTION CONCENTRATOR OF AN EDGE DIGITAL GATE OPERATING AT AN EDGE OF A TELECOMMUNICATION NETWORK, CONNECTIONS IN THE TELECOMMUNICATIONS NETWORK 506

PROVIDE, BY AN IDENTITY REPOSITORY OF THE EDGE DIGITAL GATE, A SHARED CACHE THAT, TOGETHER WITH OTHER IDENTITY REPOSITORIES OF ONE OR MORE OTHER EDGE DIGITAL GATES, FORMS A SHARED DATA ENVIRONMENT OF THE TELECOMMUNICATIONS NETWORK 508

DETERMINE, BY AN ENTITLEMENT GATEWAY OF THE EDGE DIGITAL GATE, ONE OR MORE ENTITLEMENTS TO BLOCKCHAIN-BASED DIGITAL SERVICES ASSOCIATED WITH THE TELECOMMUNICATIONS NETWORK 510

PUBLISH, BY THE EDGE DIGITAL GATE, SUBSCRIBER ACTIVITY ASSOCIATED WITH THE ONE OR MORE ENTITLEMENTS VIA A DECENTRALIZED LEDGER OF THE TELECOMMUNICATIONS NETWORK 512

FIG. 5

CARRIER GRADE TELECOM BLOCKCHAIN

BACKGROUND OF THE INVENTION

Due to the large geographic coverage areas and the number of end users served by telecommunications ("telecom") networks, technology behind these networks must exhibit carrier grade performance and scalability. The technology must efficiently use network resources and power. An increasing number of services delivered across a telecom network, and by multiple vendors, exacerbates the network scale problem because data travelling across the telecom network requires computational resources and network bandwidth. Currently, there is a focus to place technology at the edge of the telecom network to handle services closer to where they are needed so that data traversal paths are minimized. However, what is needed is to be able to securely store and access data, including entitlement assessment and value transfer relating to services provided to entities over the telecom network. These and other problems exist with conventional services provisioned across a telecom network.

BRIEF DESCRIPTION OF THE DRAWINGS

FIG. 5 is a block diagram of an example computing component or device for executing an edge digital gate in a blockchain network, according to an implementation of the disclosure.

DETAILED DESCRIPTION

Embodiments provide an edge digital gate ("EDG") configured with entitlement services, universal identity repositories, and connection concentrator functions. The universal identity repositories each include a shared cache that together with other shared caches form a shared data environment ("SDE"). The SDE provides a distributed and shared cache used to chain together EDGs for operation as a blockchain network. The SDE may be check-pointed by stateless Virtual Network Functions ("VNFs") executing on the EDGs responsive to service demand and access, thus facilitating distributed consensus for validating each transaction. Through SDE the stateless VNFs disperse transaction-status based on a smart contract.

The blockchain network, formed from edge digital gates that may operate at an edge of the telecom network, may operate as a distributed state machine that stores and validates status and transactions based on smart contracts executed on behalf of entities that connect through the telecommunication ("telecom") network through their devices. The transactions may relate to access, enrollment, and service provision for various blockchain-based services that may be provided by a telecom network operator (also referred to interchangeably as a Mobile Network Operator, or MNO, or Communications Service Provider, or CSP) or third parties that provide services over the telecom network.

When an entity attempts to access a blockchain-based digital service via the telecom network, one or more EDGs may be selected to perform entitlement, record an identity of the subscriber, and perform connection concentrator functions for subscriber communications. Smart contracts may enforce transactions associated with blockchain-based digital services. For example, automated value exchange may be executed for access to the services and/or subscriptions to such services may be validated. The activity may be recorded on a decentralized ledger of a blockchain network, generating a cookie trail of activity of the subscriber.

Figure 1:
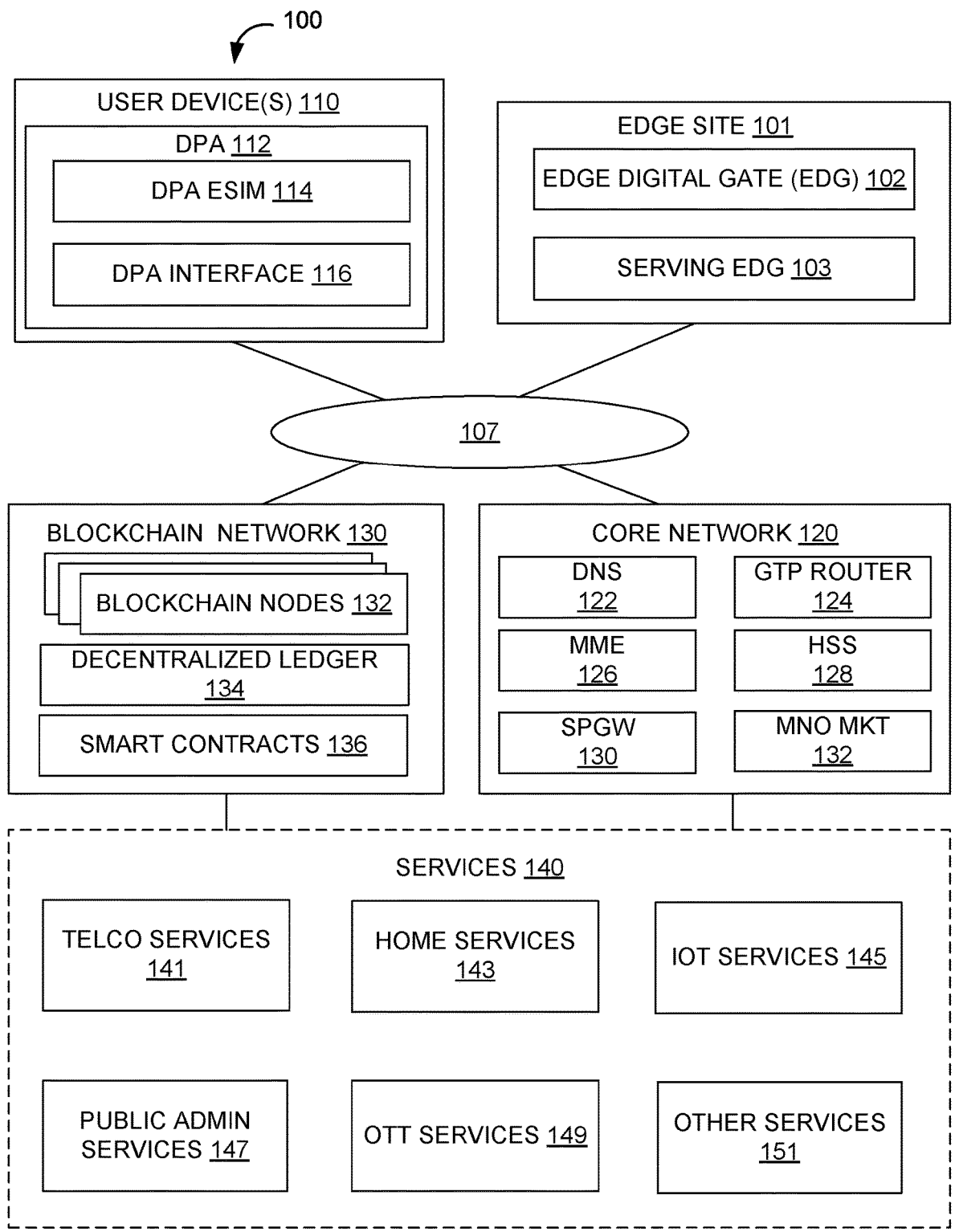
FIG. 1 illustrates a system of providing access to subscribed services, which may be blockchain-based, in a telecom network, according to an implementation of the disclosure.

FIG. 1 illustrates a system 100 of providing access to services 140, which may be blockchain-based, in a telecom network, according to an implementation of the disclosure. System 100 may include one or more user devices 110, an edge site 101 (typically multiple edge sites 101), a core network 120, blockchain network 130, and/or other components. The telecom network (not expressly illustrated) may include the core network 120, the edge site 101, one or more access points such as base stations to which the user devices 110 connect to access a Wide Area Network such as the Internet, and/or other telecom components. Each of the components of system 100 may be connected to one another by way of wireless and/or wired connections via a network 107.

The one or more user devices 110 may include devices that access the services 140 through the telecom network. For example, the user device 110 may include an Internet of Things ("IoT") device, tablets, laptops, smartphones, smartwatches, and/or other devices that can access the services 140. Each device 110 may access multiple services 140. A given user may be associated with multiple user devices 110. The services 140 may be offered by third parties and/or the MNO of the telecom network. The services 140 may include one or more telco services 141, one or more home services 143, one or more IoT services 145, one or more public admin services 147, one or more Over-the-Top ("OTT") services 149, and/or other services 151. It should be understood that although services 140 are illustrated together, services 140 are not necessarily hosted/provided by a single or co-located services providers.

As will be described in more detail, the user device 110 may execute a DPA 112 implementing a digital persona that represents an entity across the different services 140. The DPA 112 may include an eSIM component of the DPA 112 and an interface component of the eSIM. The eSIM component will be referred to as the DPA eSIM 114 and the interface component will be referred to as the DPA interface 116. As such, the DPA 112 may implement a user-centric, rather than service-centric, ecosystem for access control and service provision. For example, the digital passport application links virtual identifiers (such as login usernames) used to access each service 140 to a universal digital identifier. Each digital passport application executing on each user device 110 may implement a digital persona that represents an entity defined by the virtual identifiers linked to a digital identifier through a public key, and connected to a physical identifier through a private key. Entities may digitally sign data such as transactions to be written to the decentralized ledger 134 or various tokens described herein using the private key. Using the DPA 112, an entity may access different services 140 through a single digital persona.

In some implementations, the services 140 may be blockchain-based in that they may be transacted using the blockchain network 130. For example, one or more smart contracts 136 of the blockchain network 130 may be used to define terms of accessing the services 140. In this example, access to and use of the services 140 may be automatically executed by the smart contracts 136. In some instances, activity of users using the services 140 may be recorded on one or more decentralized ledgers 134 of the blockchain network 130. In these and/or other ways, the services 140 may be blockchain-based. Services 140 that are blockchain-based will also be referred to as "blockchain-based services." The blockchain network 130 includes a plurality of blockchain nodes 132 that communicate with one another. Such communication may be via a peer-to-peer communication protocol. Each of the blockchain nodes 132 store a full or partial copy of the decentralized ledger 134. The decentralized ledger 134 may be composed of ledger blocks that each refer back to a hash of a prior ledger block. Each blockchain node 132 may be programmed with a blockchain agent that includes logic for interacting with other blockchain nodes, writing transactions, writing ledger entries, participating in consensus decisions, and/or performing other blockchain related functions.

In some instances, the smart contracts 136 may specify terms agreed to by various parties, such as an entity that accesses one or more of the services 140 and providers of the services. In some instances, each smart contract 136 may include logic or rules for automatically executing the terms of the contract, including access control, service level agreement terms, subscriptions, and/or other aspects of service provision. One or more components of the telecom network may be a blockchain node 132 of the blockchain network 130. In other words, a component of the telecom network may be programmed with the blockchain agent. For example, the EDG 102 may act as a blockchain node 132.

The cellular network may include one or more edge sites 101. Each edge site 101 may include one or EDGs 102 and one or more serving EDGs 103. A serving EDG 103 may include an EDG that provides a listing of blockchain-based services to requesting user devices and may route access to the services through an EDG 102.

From a user perspective, the disclosure provides a secure and trusted user-centric access to the digital services incubated by a telecom blockchain, as well as a simplified user experience in discovering, enrolling and using blockchain-based digital services. The disclosure further provides an agnostic user experience from a wide range of devices (such as IoT devices, tablets, laptops, smartphones, smartwatches, etc.) and their location. The user-centric approach of the disclosure uses a universal identifier, allowing identity processes to operate on a global, de-parameterized scale, binding between physical identifiers, digital identifiers, and virtual identifiers that permit a user to select and invoke the correct digital identity to access corresponding resources.

The core network 120 may include a Domain Name System ("DNS") 122, a GPRS Tunneling Protocol ("GTP") router 124, a Mobility Management Entity ("MME") 126, a Home Subscriber Server ("HSS") 128, an Packet Data Network Gateway ("SPGW") 130, an MNO marketplace ("Mkt") 132, and/or other components. DNS 122 may manage Internet Protocol addresses for various system components. GTP router 124 may route requests from the user device 110 to an appropriate EDG 101. MME 126 may include key control for authenticating a user device 110 at HSS 128. HSS 128 may authenticate a requesting user device 110 to join the cellular network. Other types of authentication servers may be used as well, depending on the type of cellular network used. SPGW 130 may manage communications between 3GPP technologies and non-3GPP technologies.

MNO marketplace ("Mkt") 132 may include a listing of all available services 140 accessible through a cellular network of the MNO. Different MNOs may have different MNO marketplaces 132. At least some of the available services may include blockchain-based services.

Figure 2:
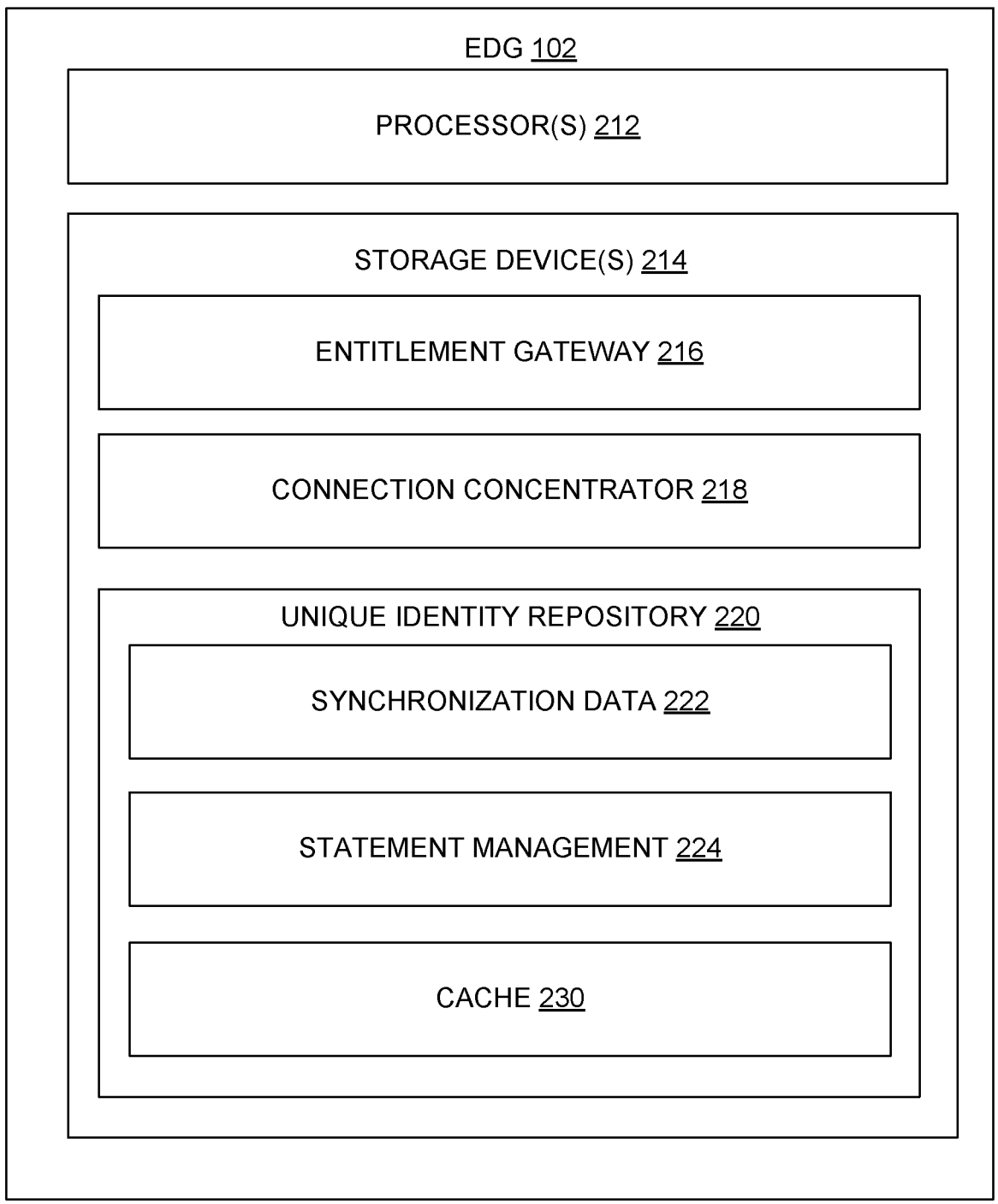
FIG. 2 illustrates an example of an edge digital gate, according to an implementation of the disclosure.

FIG. 2 illustrates an example of an EDG 102, according to an implementation of the disclosure. EDG 102 may include one or more physical processors 212, one or more storage devices 214, and/or other components. The one or more storage devices 214 may store various instructions that program the processors 212. For example, the one or more storage devices 214 may include an entitlement gateway 216, a connection concentrator 218, and/or other instructions.

The entitlement gateway 216 may use one or more stateless Virtual Network Functions ("VNFs") that perform entitlement functions. Thus, an EDG 102 may determine—at an edge using Mobile Edge Computing principles—whether a given entity, represented by the DPA 112 for the entity, is entitled to access services 104, and in particular, blockchain-based services. The unique identity repository 220 may act as a storage VNF. As such, each EDG 102 may act as a micro-database and network edge validator node in a person-2-person ("P2P") transaction. Each EDG 102 may be deployed and released as-needed. The stateless VNF and storage VNF may be implemented by VNF and Software Defined Network technologies. As such, they may be loaded and targeted to appropriate EDGs 102 as needed.

When a user device 110 accesses the telecom network, the DPA 112 may request access to one or more of the services 140 on behalf of the user represented by the DPA. The entitlement gateway 216 may enroll the DPA 112 to access the one or more services 140. Such enrollment may include obtaining virtual identities associated with the services 140. Upon enrollment, the entitlement gateway 216 may generate a token for the DPA 112, which digitally signs the token using its private key. The token is a collection of data that includes, without limitation, user data, transaction data, and/or other data relating to the user represented by the DPA 112. The user data may include information relating to the digital persona of the user, including virtual identities. The transaction data may include information indicating usage of various services 140. As such, the token may be updated each time the user accesses one or more of the services 140 and may represent a trail of activity by the user (more particularly, the DPA 112 of the user) with respect to services 140. The token may be implemented as multiple tokens such as an access token that is used to authenticate the user/DPA 112 and a service token that is used to store user activity with respect to a service 140. The access token may store the user data and the service token may store the transaction data.

Each EDG 102, to which the DPA 112 is directed for providing access to a requested service 140, may obtain the token from the DPA 112 and authenticate the token for ensuring that the DPA 112 is entitled to access the requested service 140. Upon authentication and access provision, the EDG 102 may update the token indicating such access. In some instances, the EDG 102 may update the token to indicate user activity with respect to the requested service 140. In some instances, the EDG 102 may update the token to indicate transactions executed in association with the requested service 140. For example, each time a transaction is executed using a smart contract 136, the responsible EDG 102 may update the token with a transaction identifier or other transaction information. In these instances, the token may store a record of transactions.

In some instances, the token may be split into one or more (typically multiple) sub-tokens that are each propagated to multiple EDG 102 nodes on the blockchain network 130. Each of the multiple EDG 102 nodes may store its respective sub-token. Thus, the token as a whole may be stored as multiple sub-tokens each on a different EDG 102 node. Because the user device 110 may access different services 140 from different parts of the telecom network, a trail of sub-tokens may indicate a path of activity (serviced by different EDG 102 nodes along the path) on the network. The path and related data may be stored as synchronization data 222 described below. In these instances, when the token is to be authenticated, a serving EDG 102 may obtain the token from the DPA 112, collect all the relevant sub-tokens from EDG 102 nodes that have them (consulting the synchronization data 222, for example), reassemble the token from the collected sub-tokens, and compare the reassembled token with the token provided by the DPA 112. In this manner, multiple EDG 102 nodes may participate in authenticating and updating the token.

The connection concentrator 218 may establish connections to the telecom network based on a user data plan function. As such, an EDG 102 may enforce user data plans.

The one or more storage devices 214 may also include a unique identity repository 220. The unique identity repository 220 may include synchronization data 222, state management 224, and/or other data. The unique identity repository 220 may store unique identities of subscribers currently connected to and served by the EDG 102.

The synchronization data 222 refers to data that is to be propagated to a finite list of additional physical locations (such as EDG 102 nodes), all of which are maintained in a consistent state when any single location is updated. Tokens may be propagated along the sub-token path and may be updated as EDG 102 nodes are entered on the chain. The synchronization data 222 may maintain consistency of the sub-tokens along the various EDG 102 nodes. As previously described, at service enrollment a token is created at an EDG 102 to which the DPA 112 is bound. Once the token is created it may be propagated, as sub-tokens, in the blockchain network of EDG 102 nodes for multi-node storing. These nodes may participate in the subsequent requests of token validation. The sub-token path across EDG 102 nodes is maintained through the synchronization data 222. Trail paths among EDG 102 nodes belonging to a blockchain set are created and initialized by a VNF orchestrator upon EDG instantiation and deployment.

The state management 224, where state can generally refer to a condition, configuration, or other status of, for example, an EDGE VNF may store the context of EDG 102 VNFs (such as application status, sessions information, smart contracts transaction state) for the execution of transactions and transition to the next state and validation, as well as for scaling out EDG-stateless instances in case of overload or in case of node fault. EDG 102 nodes belonging to a common blockchain set may share the same context. EDG 102 VNFs may maintain session data in various ways. Each technique may be associated with a fault zone of a particular scope within a solution. A fault zone is defined as the perimeter of effect when a given component is rendered inactive or unavailable from the point of view of the larger solution.

One example of maintaining the session data includes using hash tables maintained within the address space of a process or service. This method is employed to manage contextual data that is highly dynamic. An example would be the storage of the HTTP/2 stream information within a protocol gateway virtual network function component (VNFC). The data is associated with a particular HTTP/2 connection. Because the connection terminates within a single process, the necessary scope of visibility and access to the state is confined to the process handling the connection. The fault zone of this data is the perimeter of the executing VNFC instance. Loss of the VNFC instance results in the loss of the data. This is appropriate because the fault zone of the HTTP/2 connection is the instance itself.

Another example of maintaining the session data includes doing so between process instances on a compute node. In order to keep the instance context free, sufficient information is assembled and associated with a unique identifier. To reacquire the context the identifier is echoed back by the process at the far end of a network connection. In this example the term "far" is a relative term to a given compute node. The information is written into shared memory, permitting memory-speed access. When the response is received the application logic will retrieve the information from the shared memory construct. Ordinarily this process is expedited by structuring the messaging patterns so that messages processed remotely are returned to the original sender for completion. Occasionally this is not possible, in which case is it sometimes necessary to route the response to the shared memory that contains the information such as across virtual machines (VMs) or container boundaries. The fault zone for this type of information is the shared memory and surrounding processes. The scope is greater than an individual process instance but less than that of a complete VNF. It should be noted that a process stopping and restarting will not cause the information to be lost.

The unique identity repository 220 may include one or more cache(s) 230. The cache(s) 230 may serve as temporary data storage areas for transaction processing at an EDG 102. As will be described further below with respect to FIG. 3, the cache(s) 230, together with other cache(s) 230 of other EDGs 102, form a shared data layer among the EDGs 102.

Figure 3:
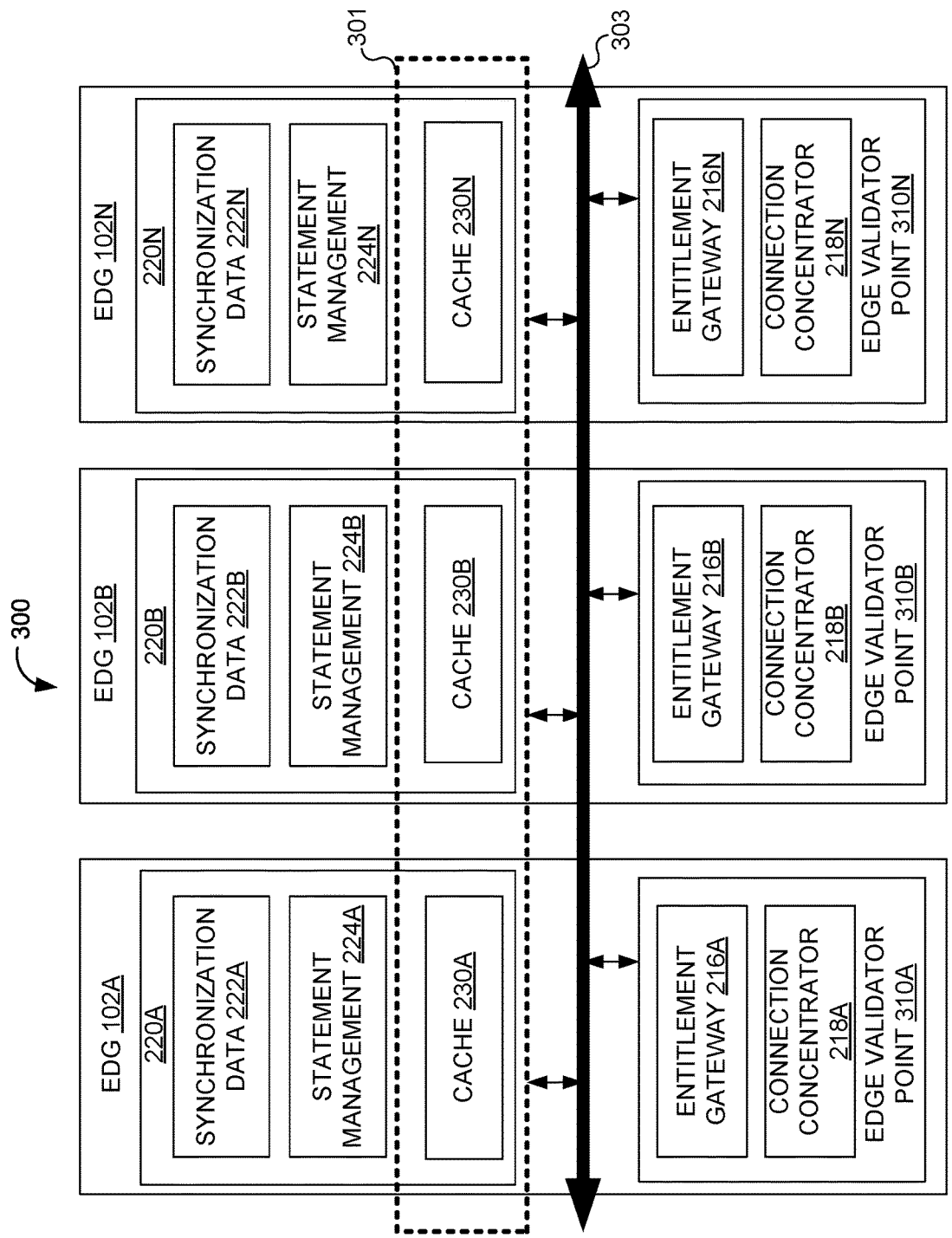
FIG. 3 illustrates an example of an architecture for a shared data layer among edge digital gates, according to an implementation of the disclosure.

FIG. 3 illustrates an example of an architecture 300 for a Shared Data Layer ("SDL") 301 among edge digital gates 102A-N, according to an implementation of the disclosure. It should be understood that like reference symbols in FIGS. 2 and 3 for a given EDG 102A-N represent the same elements.

The SDL 301 comprises a plurality of edge-based instances of unique identity repositories 220A-N, which themselves may be micro-databases. As such, the SDL 301 enables the EDGs 102 to form a Shared Data Environment ("SDE") 303. The SDE 303 may provide data sharing and connections to form the blockchain network 130, as will be described with respect to FIG. 4. Individually each unique identity repository 220 stores only those subscribers presently being served by the corresponding EDG 102 and tokens for rebuilding transaction status. Collectively, all instances of unique identity repositories 220 represent the full subscriber and enterprise population served by the blockchain network 130.

In some implementations, persistence and resistance to information loss of the SDE 303 may achieved through a database implementation. For example, each cache 230 may be configured to move data from its in-memory cache to a persistent storage database with variable degrees of aggressiveness. The perimeter of the database itself, often a shard, also defines the fault zone. State information, data that reflects the state of a connection to an entity like a voice subscriber, an IoT device, or a business entity that is stored in the database will survive complete shutdown of a solution.

The SDE 303 may include a microservice that can provide data storage for multiple EDG Network Entitlement Functions ("NFs"), which may be either distributed or centralized. It should be understood that a microservice can refer to, e.g., one of or some subset of functions that operate together with other microservices to effectuate a general application or function. The SDL 301 may be centralized while for large deployment with e.g. mobile edge computing (MEC), the function may be distributed closer to the EDG NFs requiring its service.

Additionally, each of EDG 102A, 102B, and 102N may further comprise edge validator points 310A, 310B, and 310N, respectively. Each of edge validator points 310A, 310B, and 310N may include respective entitlement gateways 216A, 216B, 216N, and respective connection concentrators 218A, 218B, and 218N.

Figure 4:
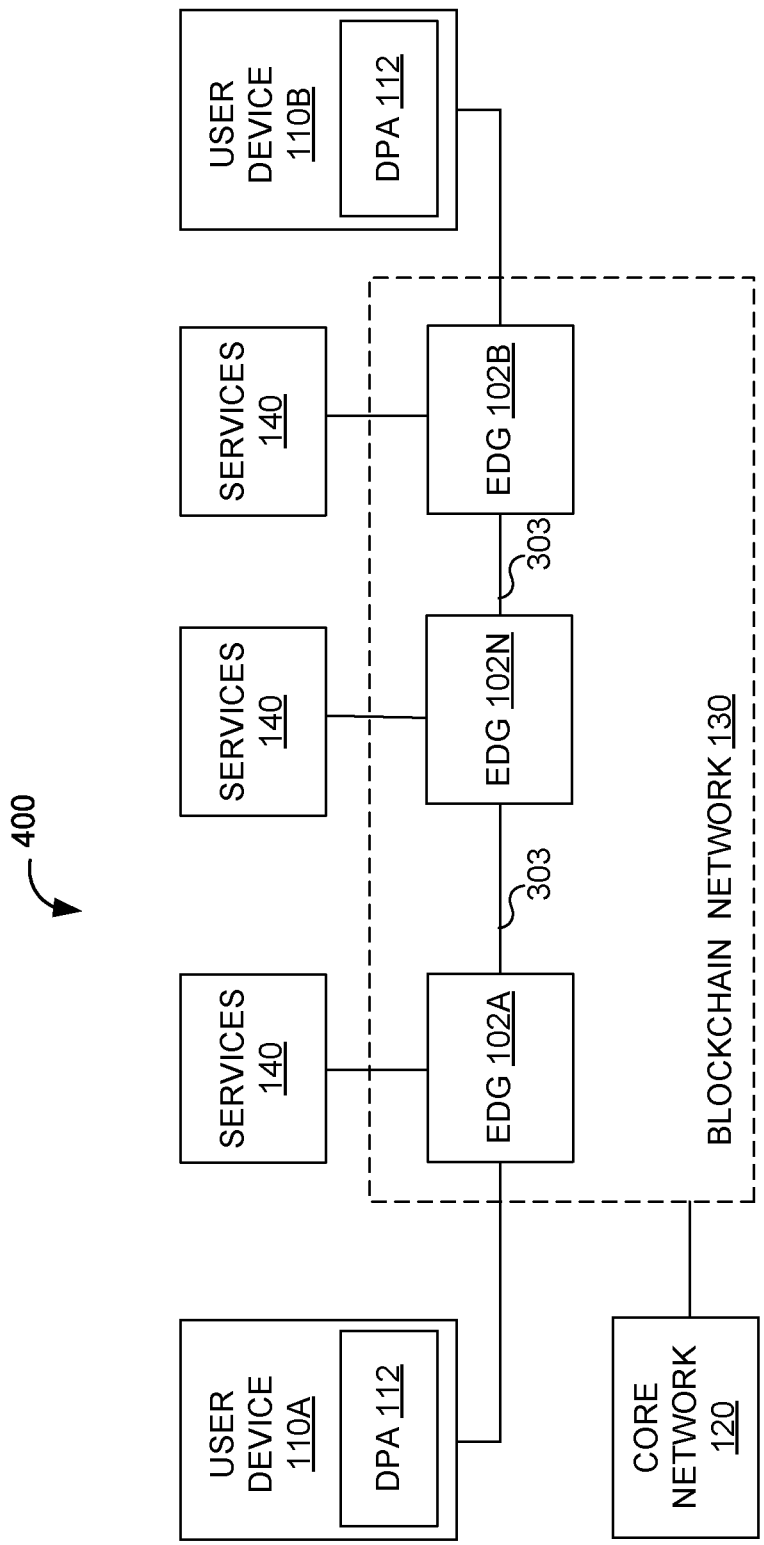
FIG. 4 illustrates an example of edge digital devices deployed as distributed edge nodes in a blockchain network for providing access to blockchain-based services, according to an implementation of the disclosure.

FIG. 4 illustrates an example of edge digital devices 102A-N deployed as distributed edge nodes in a blockchain network 130 for providing access to blockchain-based services, according to an implementation of the disclosure.

The SDE 303 formed by the plurality of EDGs 102 may provide the data connections to form the blockchain network 130. As such, each EDG 102A-N may act as a blockchain node. The SDE 303 provides a distributed and shared cache that is check-pointed by EDG stateless network functions for blockchain service demand and access, facilitating distributed consensus for validating the sanctity of each transaction submitted to the blockchain network 130. Through SDE 303, the stateless VNFs of the EDGs 102 disperse transaction-status behind a smart contract 136 in the blockchain network 130 as elementary tokens.

The blockchain network 130, formed from EDG 102A-N using MEC technologies, behaves as a distributed state machine, residing at or near the network edge, able to store and validate status and transactions based on a smart contract 136, which may be executed on behalf of a an entity, as represented by the DPA 112. Each EDG 102 in the blockchain network 130 may act as an authoritative microdatabase and network edge validator node in a person-to-person (P2P) transaction. Each EDG 102 may establish trust and enable access to one or more of the services 140. The EDG 102 may be deployed at the network edge, optionally within Multi-Access Edge Computing (MEC) nodes, and selected either through 5G Network Slice Selection and/or through by way of an edge-based GTP Router.

As such, the blockchain network 130 composed of EDGs 102 provides the ability to manage identities and, in addition, provide the required trail of digital of records and connections, identifiers, and means of authentication. Such trail may include subscriber activity such as access to services 140, enrollment in services 140, transactions executed by the entity, and/or other activity of entities using the system 100. Deployed at or near the network edge, independently or within a MEC environment, or even centrally from the core network 120 (for example), the blockchain network 130 may correlate identities for users, subscribers, devices and their various relationships in the execution of transactions and smart contracts 136. When deployed at or near the network edge, for example, each EDG 102 may service a user device 110 through its DPA 112. For example, as illustrated, an EDG 102A may service a user device 110A and an EDG 102N may service a user device 110N. In some instances, a given user device 110 may be mobile and connect to the telecom network through different access points. The user device 110 may be routed to a given EDG 102 based, at least in part, on the location of the user device 110 in the network (as determined, for example, on the access point to which the user device 110 is connected).

As previously noted, an entity operating or associated with the user device 110 may be represented through the DPA 112, accesses or subscribes for services 140 on behalf of the entity. The services 140 may be consumed as value added interactions or sessions. Value received would be agreed and paid through on-demand smart contracts 136 validated through a chain of EDGs 102.

The EDG 102, through a client-server relationship with the DPA 112, may issue entitlements to the services 140 based on the digital persona represented by the DPA 112. The entitlements may be maintained by multiple EDGs 102, facilitating secure and auditable access to services 140. When the entity wishes to exchange value with another entity through the telecom network, the value exchange may be recorded in the decentralized ledger 134, a full or at least partial copy of which may be stored, such as via the SDE 303. The transaction indicating such value exchange may be distributed to a cluster of EDGs 102 acting as validators who would undertake "proof of work" to validate the transaction, compare their results, and generate the latest block in the decentralized ledger 134. Individuals and enterprises contracting with the MNO for blockchain-based services, may interact with a particular EDG 102. The MNO would house the various digital identities representing this entity.

The validator cluster may be associated with the communication cores providing connectivity and communication services to the entity. Parallelism, and thereby performance and scalability, would be achieved by being able to create new slices of EDG 102, and thereby new validation clusters, as needed. Creating a new slice would involve allocating the physical and software resources to support the slice and associating it with the correct digital identities. As such, resources of a given EDG 102 may be reserved and released as needed to support validation and recordation activities at scale.

Services rendered to physical entities would be obtained through smart contracts 136 with the provider of the service 140. The provider of the service 140 could be the MNO itself or it could be a separate individual or enterprise. In such manner the MNO may deliver complex services to downstream end-user customers in partnerships with upstream suppliers such as application developers, content providers, utilities, other MNOs, health service providers, and others.

FIG. 5 is a block diagram of an example computing component or device 500 for executing an edge digital gate in a blockchain network in accordance with one embodiment. Computing component 500 may be, for example, a server computer, a controller, or any other similar computing component capable of processing data. In the example implementation of FIG. 5, the computing component 500 includes a hardware processor 502, and machine-readable storage medium 504. In some embodiments, computing component 500 may be an embodiment of an EDG 102, for example.

Hardware processor 502 may be one or more central processing units (CPUs), semiconductor-based microprocessors, and/or other hardware devices suitable for retrieval and execution of instructions stored in machine-readable storage medium, 504. Hardware processor 502 may fetch, decode, and execute instructions, such as instructions 506-512, to control processes or operations for operating an EDG. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Thus, machine-readable storage medium 504 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 504 may be a non-transitory storage medium, where the term "non-transitory" does not encompass transitory propagating signals. As described in detail below, machine-readable storage medium 504 may be encoded with executable instructions, for example, instructions 506-512, for client device grouping.

Hardware processor 502 may execute instruction 506 to establish, by a connection concentrator of an edge digital gate operating at an edge of a telecommunication network, connections in the telecommunications network.

Hardware processor 502 may execute instruction 508 to provide, by an identity repository of the edge digital gate, a shared cache that, together with other identity repositories of one or more other edge digital gates, forms a shared data environment of the telecommunications network.

Hardware processor 502 may execute instruction 510 to determine, by an entitlement gateway of the edge digital gate, one or more entitlements to blockchain-based digital services associated with the telecommunications network.

Hardware processor 502 may execute instruction 512 to publish, by the edge digital gate, subscriber activity associated with the one or more entitlements via a decentralized ledger of the telecommunications network.

Figure 6:
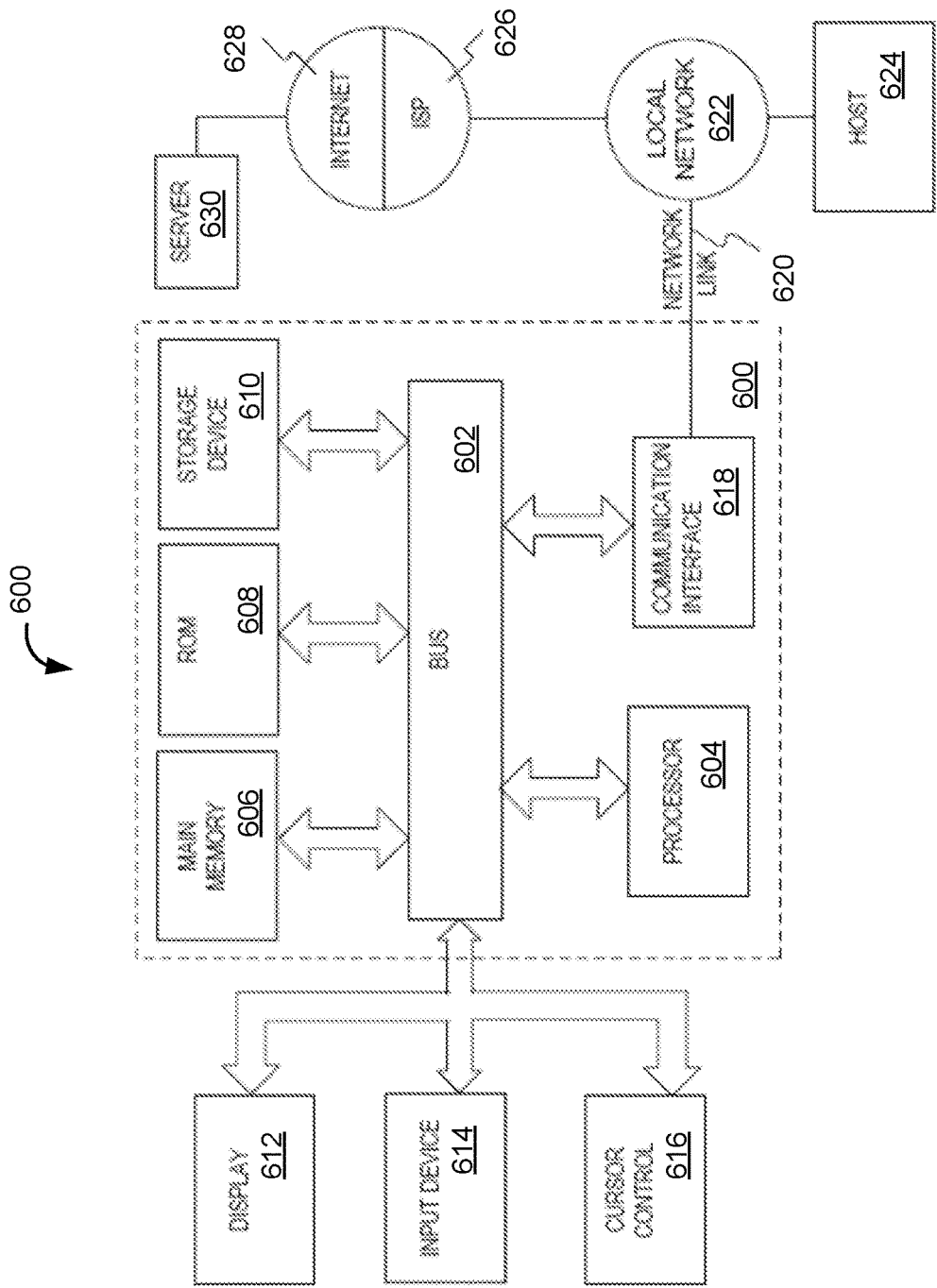
FIG. 6 depicts a block diagram of an example computer system in which any of the embodiments described herein may be implemented.

FIG. 6 depicts a block diagram of an example computer system in which any of the embodiments described herein may be implemented. The various components illustrated in FIGS. 1-4 may be implemented according to the computer system 600. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface component to implement a GUI that may be stored in a mass storage device as executable software codes that are executed by the computing device(s). This and other components may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicate with a WAN). Wireless links may also be implemented. In any such implementation, network interface 618 sends and receives electrical, electromagnetic or optical signals that carry digital data streams representing various types of information.

A network link 620 typically provides data communication through one or more networks to other data devices. For example, a network link may provide a connection through local network to a host computer 624 or to data equipment operated by an Internet Service Provider (ISP) 626. The ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server 630 might transmit a requested code for an application program through the Internet 628, the ISP 626, the local network 622 and the communication interface 618.

The received code may be executed by processor 604 as it is received, and/or stored in storage device 610, or other non-volatile storage for later execution.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system comprising:
   an edge digital gate acting as a blockchain node at an edge of a telecommunications network and comprising:
      a connection concentrator to establish connections in the telecommunications network for the edge digital gate, wherein the edge digital gate forms a blockchain network with a plurality of other edge digital gates;
      an identity repository, acting as a storage virtual network function of the telecommunications network, comprising a shared cache that, together with other identity repositories of one or more other edge digital gates of the plurality of other edge digital gates, forms a shared data environment of the telecommunications network; and
      an entitlement gateway executing a stateless virtual network function of the telecommunications network to provide or determine one or more entitlements to blockchain-based digital services on the blockchain network associated with the telecommunications network, and publish subscriber activity associated with the one or more entitlements via a decentralized ledger of the telecommunications network, wherein the subscriber activity reflects subscribers' use of the blockchain-based digital services.

2. The system of claim 1, wherein the one or more entitlements comprises an authorization to access the blockchain-based digital services or a type of the blockchain-based digital services that are permitted.

3. The system of claim 2, wherein the subscriber activity comprises at least one or more of connections to the blockchain-based digital services made, identifiers of subscribers that requested the blockchain-based digital services, and method of authentication.

4. The system of claim 1, wherein the blockchain network uses smart contracts enforcing value exchange related to the blockchain-based digital services.

5. The system of claim 1, wherein the identity repository performs one or more virtual storage functions of the telecommunications network.

6. The system of claim 1, wherein to execute the stateless virtual network function the entitlement gateway configures one or more of the blockchain-based digital services.

7. The system of claim 1, wherein the identity repository stores, in the shared cache, identities of one or more subscribers in the telecommunications network being served by the edge digital gate.

8. The system of claim 7, wherein the identity repository and at least one or more identity repositories of the one or more edge digital gates collectively comprise all identities of all subscribers of the telecommunications network.

9. A method, comprising:
   establishing, by a connection concentrator of an edge digital gate of a plurality of edge digital gates operating at an edge of a telecommunications network, connections in the telecommunications network, the plurality of edge digital dates forming a blockchain network and the edge digital gate acting as a blockchain node;
   providing, by an identity repository of the edge digital gate, a shared cache that, together with other identity repositories of one or more other edge digital gates of the plurality of edge digital gates, forms a shared data environment of the telecommunications network, the identity repository acting as a virtual storage function of the telecommunications network;

determining, by an entitlement gateway of the edge digital gate, one or more entitlements to blockchain-based digital services on the blockchain network associated with the telecommunications network, the entitlement gateway executing a stateless virtual network function of the telecommunications network; and publishing, by the edge digital gate, subscriber activity associated with the one or more entitlements via a decentralized ledger of the telecommunications network, the subscriber activity reflecting subscribers' use of the blockchain-based digital services.

10. The method of claim 9, wherein the one or more entitlements comprises an authorization to access the blockchain-based digital services or a type of the blockchain-based digital services that are permitted.

11. The method of claim 10, wherein the subscriber activity comprises at least one or more of connections to the blockchain-based digital services made, identifiers of subscribers that requested the blockchain-based digital services, and method of authentication.

12. The method of claim 9, the method further comprising:

obtaining a smart contract of the blockchain network; and facilitating value exchange related to the blockchain-based digital services based on the smart contract.

13. The method of claim 9, wherein executing the stateless virtual network function the entitlement gateway comprises configuring one or more of the blockchain-based digital services.

14. The method of claim 9, the method further comprising:

storing, by the identity repository in the shared cache, identities of one or more subscribers in the telecommunications network being served by the edge digital gate.

15. The method of claim 14, wherein the identity repository and at least one or more identity repositories of the one or more edge digital gates collectively comprise all identities of all subscribers of the telecommunications network.

16. A non-transitory computer readable storage medium comprising instructions, when executed on an edge digital gate, programs the edge digital gate to:

establish connections in a telecommunications network for the edge digital gate, the edge digital gate operating at an edge of the telecommunications network and acting as a blockchain node;

provide a shared cache that, together with other edge digital gates, forms a shared data environment of the telecommunications network, the edge digital dates and the other edge digital gates forming a blockchain network;

provide or determine one or more entitlements to blockchain-based digital services on a blockchain network associated with the telecommunications network using a stateless virtual network function of the telecommunications network; and publish subscriber activity associated with the one or more entitlements via a decentralized ledger of the telecommunications network, the subscriber activity reflecting subscribers' use of the blockchain-based digital services.

17. The non-transitory computer readable storage medium of claim 16, the instructions further programming an associated user device to:

obtain a smart contract of the blockchain network; and facilitate value exchange related to the blockchain-based digital services based on the smart contract.

* * * * *